Feb. 15, 1966  T. F. BELL ETAL  3,234,935
HORSE THERAPY LEG BATHING DEVICE WITH AIR BUBBLING MEANS
Filed April 11, 1963  2 Sheets-Sheet 1
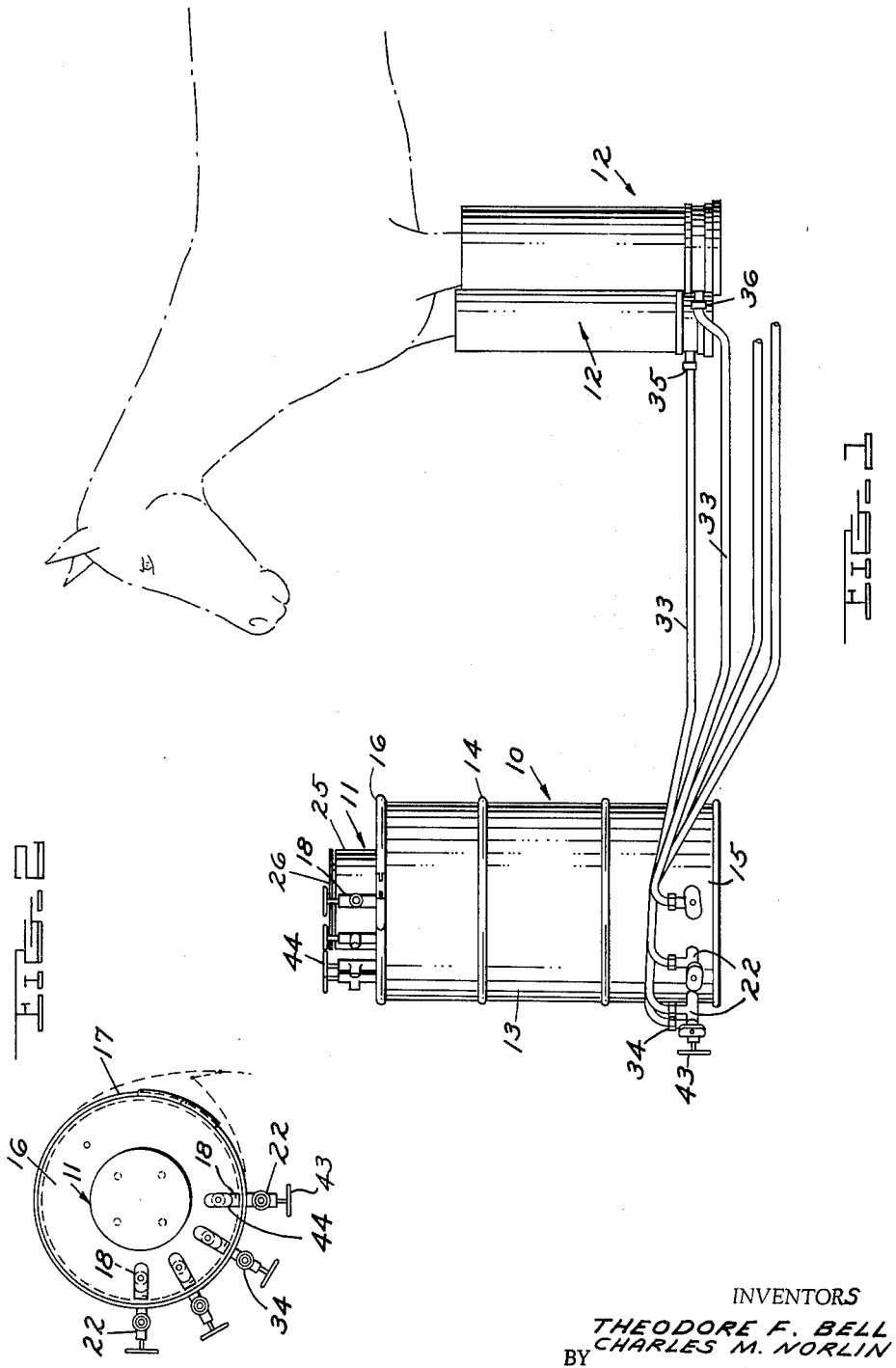
INVENTORS
THEODORE F. BELL
CHARLES M. NORLIN
BY
*Barnes, Kisselle, Raisch & Choate*
ATTORNEYS Feb. 15, 1966 T. F. BELL ETAL 3,234,935
HORSE THERAPY LEG BATHING DEVICE WITH AIR BUBBLING MEANS
Filed April 11, 1963 2 Sheets-Sheet 2

INVENTOR.
THEODORE F. BELL
CHARLES M. NORLIN
BY

ATTORNEYS

United States Patent Office 3,234,935
Patented Feb. 15, 1966

3,234,935
HORSE THERAPY LEG BATHING DEVICE
WITH AIR BUBBLING MEANS
Theodore F. Bell, Hazel Park, and Charles M. Norlin, Warren, Mich. (Both of 22813 Dequindre, Hazel Park, Mich.)
Filed Apr. 11, 1963, Ser. No. 272,411
12 Claims. (Cl. 128—66)

This invention relates to horse therapy and particularly to the treatment of the legs of horses and the like.

It has long been known that the treatment of the legs of animals by liquids and massage will facilitate the healing of injuries to the knees and ankles and particularly to the muscles and ligaments thereof.

It is an object of this invention to provide a method and apparatus for efficiently treating the entire leg or legs of an animal such as a horse or the like.

It is a further object of the invention to provide such a method and apparatus wherein the treatment can be conducted quickly with a minimum of labor and expense.

It is a further object of this invention to provide such an apparatus which is efficient, simple and low in initial and operating costs.

It is a further object of the invention to provide such an apparatus which contains means for storing a treating liquid.

It is a further object of the invention to provide such an apparatus which utilizes conventional lengths of connecting hose.

In the drawings:

FIG. 1 is a side elevation of an aparatus embodying the invention.

FIG. 2 is a top plan view of a portion of the apparatus.

Figure 3:
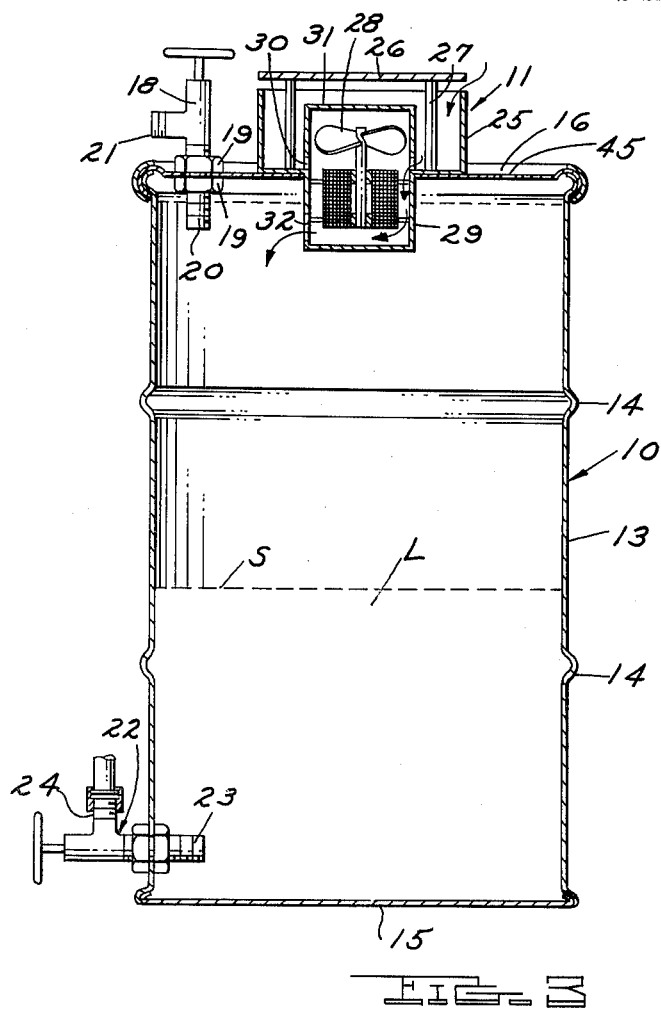
FIG. 3 is a vertical sectional view through the portion of the apparatus shown in FIG. 1.

Referring to the drawings, the apparatus embodying the invention comprises a container 10 which is adapted to contain a treating liquid such as water, vinegar, epsom salts and water, and the like. A blower 11 on the upper end of the container 10 is adapted to selectively provide the liquid to boot assemblies 12 in which the legs of the animal such as the horse are positioned and to force air through the liquid in the boot assemblies 12 in order to vigorously treat the legs of the animal by massage due to the action of the air bubbling through the liquid.

Specifically, the container 10 comprises a drum such as a 40-gallon drum having a side wall 13 with annular horizontal ribs 14, a bottom wall 15 and a removable cover 16 removably mounted in sealing relation on the upper end of the wall 13 by a conventional over-center clamp ring 17.

A first set of conventional water faucets 18 are mounted on the cover 16 by conventional nuts 19 threaded on projections 20 that extend through the cover. The faucets 18 provide communication between the upper end of the interior of the container 10 and the outlets 21 of faucets 18. A second or lower set of conventional water faucets 22 are provided adjacent the lower end of wall 13 of the container 10 and are similarly provided with projections 23 providing communication from the interior of the container 10 to an exterior connection 24.

As shown in FIG. 3, blower 11 comprises a cylindrical casing 25 fixed on cover 16 and a cover plate 26 spaced from the casing 25 and supported by rods 27. Air is adapted to be drawn between the cover plate 26 and the wall of casing 25 by a fan 28 operated by a motor 29. The air is forced by fan 28 through an opening 30 of an inner casing 31 extending through an opening in cover 16 and thereafter through an outlet 32 in inner casing 31 into the container 10. As further shown in FIG. 3, a liquid L for treating the legs of the animal is provided in the container 10.

The outlets 21, 24 of the faucets 18, 22, respectively, are provided with male threads in the manner of well-known faucets and hoses 33 having rotatable female connections 34 are adapted to be selectively connected either to faucets 18 or faucets 22. The other end of each hose 33 is provided with a male threaded connection 35 which is received in a female connection 36 of a fitment 37 mounted on the base 38 of each boot assembly 12. Hose 33 may be lengths of conventional garden hose.

Figure 4:
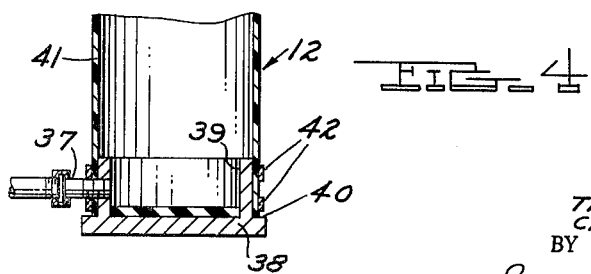
FIG. 4 is a vertical sectional view through another portion of the apparatus shown in FIG. 1.

As shown in FIGS. 1 and 4, each boot assembly 12 comprises a base 38 with an upstanding cylindrical wall 39 having an outer diameter of slightly less than the outer diameter of the lower portion of the base to provide a shoulder 40. Each boot assembly 12 also includes a cylindrical tube 41 of flexible material such as polyethylene which is slipped over the upstanding wall 39 and fixed in sealing relation thereto by bands 42 of metal that have their ends fastened together and clinched as by well-known fasteners.

In operation, each leg of an animal such as a horse which is to be treated, is inserted in a boot assembly 12 and the hoses 33 are connected so that they extend between the lower set of faucets 22 and the boot assemblies 12. The faucets are then opened by operation of the handles 43 and the blower 11 is energized to force air against the upper surface S of the liquid L in the container 10. This, in turn, forces the liquid through the hoses 33 into the boot assemblies 12.

If the level of the liquid initially in the drum 10 is properly determined, the air will force the liquid into the boot assemblies until all of the liquid is removed from the container above the outlets 23 of the faucets 22 and the liquid is at the desired level in the boot assemblies 12. Continued operation of the blower 11 will force air through the hoses 33 and cause the air to bubble through the liquid in the boot assemblies 12. By this arrangement, the filling of the boot assemblies and the forcing of air through the liquid in the boot assemblies is achieved by a single operation through the lower set of faucets 22.

However, if the liquid level in the container 10 is greater than that required to fill the number of boot assemblies used to the required level, then the valves 22 are closed after the boot assemblies 12 are filled to the desired level and the hoses 33 are disconnected from the faucets 22 and connected to the faucets 18 at the upper end of the container. The faucets 18 are then opened by operation of handles 44 so that air is forced by the blower 11 through the hoses 33 and into the liquid in the boot assemblies 12 where it bubbles through the liquid in the boot assemblies. During this changeover, the blower 11 can be operated without stopping. An excess build-up of pressure in the container 10 is prevented by a vent 45 in the cover 16 which permits air to leak slowly from the container 10 such that a build-up of high pressure is prevented.

After the treatment of the animal is completed, the blower 11 is de-energized. If the hoses are connected to the lower end of the container 10, during the bubbling of the air, mere elevation of the boot assemblies 12 after the legs of the animal are removed will cause the liquid to enter the container 10 by gravity after which the faucets 22 can be closed and the hoses 33 disconnected. In the event that the forcing of the air is achieved through the use of the upper faucets, the liquid can be returned to the container 10 after the legs of the animal are removed from the boot assemblies by elevating the boot assemblies, causing the liquid to drain by gravity through the hoses 33 into the container 10.

It can thus be seen that there has been provided a method and apparatus for quickly, efficiently and economically treating the legs of animals such as horses and the like. The apparatus is relatively simple, low in cost and self-storing and utilizes conventional hoses 33 which can be replaced easily without great expense in case of damage.

We claim:

1. An apparatus for treating the legs of horses or the like comprising
   a closed container,
   a blower having an outlet communicating with the upper end of said container for blowing air from the exterior into said container,
   an upper set of faucet means on said container,
   a lower set of faucet means on said container below the normal level of liquid in said container,
   a plurality of boot assemblies comprising a base and an upstanding wall into which the leg of the horse or the like can extend,
   each said boot assembly having an inlet,
   and a plurality of hoses connected to the lower set of faucets and the inlets of said boot assemblies so that when the blower is operated the liquid is forced by air pressure from the container to said boot assemblies to fill the boot assemblies,
   said hoses being adapted to be selectively connected to the upper set of faucets and said inlets of said boot assemblies for forcing air under pressure by operation of said blower from the upper end of the container through said hoses and the inlets of the boot assemblies and through the liquid in the boot assemblies to treat the legs of the horse or the like.

2. The combination set forth in claim 1 wherein said container has a removable cover on the upper end thereof,
   means for holding said cover in pressure sealing relation to said container,
   said cover having a vent therein providing a safety device in the event that said blower is energized when said faucets are closed.

3. The combination set forth in claim 1 wherein the lower set of faucets are positioned at a predetermined level with respect to the level of the liquid in the container such that after the liquid has been forced through the lower sets of faucets into the boot assemblies to a predetermined level in the boot assemblies the air can thereafter continue to pass through said lower set of faucets to said boot assemblies.

4. The combination set forth in claim 1 wherein each said boot assembly has an upstanding flange on the base thereof,
   said wall of said boot assembly engaging the outer surface of said flange,
   and strap means for securing said wall in sealing relation on the outer surface of said flange.

5. The combination set forth in claim 1 wherein said wall of each said boot assembly is made of polyethylene.

6. The combination set forth in claim 1 wherein said blower is mounted on the upper end of said container.

7. An apparatus for treating the legs of horses or the like comprising
   a closed container,
   a blower mounted on the upper end of said container for blowing air from the exterior into said container,
   an upper set of faucet means on said container,
   a lower set of faucet means on said container below the normal level of stored liquid in said container,
   a plurality of boot assemblies comprising a base and an upstanding wall into which the leg of the horse or the like can extend,
   each said boot assembly having an inlet,
   and a plurality of hoses connected to the lower set of faucets and the inlets of said boot assemblies so that when the blower is operated, the liquid is forced by air pressure from the container to said boot assemblies,
   said hoses being adapted to be selectively connected to the upper set of faucets and said inlets of said boot assemblies for forcing air under pressure by operation of said blower from the upper end of the container through said hoses and the inlets of the boot assemblies and through the liquid in the boot assemblies to treat the legs of the horse or the like,
   each said hose having male and female connections at the opposite ends thereof, respectively,
   each said faucet having a complementary male connection,
   each said inlet having a complementary female connection.

8. An apparatus for treating the legs of horses or the like comprising
   a closed container,
   a blower having an outlet communicating with the upper end of said container for blowing air from the exterior into said container,
   a set of faucet means on said container below the normal level of stored liquid in said container,
   a plurality of boot assemblies comprising a base and an upstanding wall into which the leg of the horse or the like can extend,
   each said boot assembly having an inlet,
   and a plurality of hoses connected to the set of faucets and the inlets to said boot assemblies so that when the blower is operated, the liquid is forced by air pressure from the container to said boot assemblies,
   said set of faucets being positioned at such a level with respect to the level of the liquid in the container such that after the liquid has been forced through the faucets into the boot assemblies to a predetermined level in the boot assemblies,
   the air can thereafter continue to pass through said faucets to said boot assemblies.

9. The combination set forth in claim 8 wherein said container has a removable cover on the upper end thereof,
   means for holding said cover in pressure sealing relation to said container,
   said cover having a vent therein providing a safety device in the event that said blower is energized when said faucets are closed.

10. The combination set forth in claim 8 wherein each said boot assembly has an upstanding flange on the base thereof,
    said wall of said boot assembly engaging the outer surface of said flange,
    and strap means for securing said wall in sealing relation on the outer surface of said flange.

11. The combination set forth in claim 8 wherein each said hose has a male and female connection at the opposite ends thereof respectively,
    each said faucet having a complementary male connection,
    each said inlet having a complementary female connection.

12. The combination set forth in claim 8 wherein said blower is mounted on the upper end of said container.

References Cited by the Examiner

UNITED STATES PATENTS

| | | | |
|---|---|---|---|
| 608,228 | 8/1898 | Schnee | 128—370 |
| 615,437 | 12/1898 | Dillon | 168—2 |
| 2,238,872 | 4/1941 | Mather et al. | 119—159 |
| 2,611,341 | 9/1952 | Paris | 119—158 |
| 2,956,565 | 10/1960 | Anderson | 128—369 |
| 3,026,540 | 3/1962 | Barker | 4—182 |
| 3,155,072 | 11/1964 | Owens | 128—66 XR |

FOREIGN PATENTS 757,759  10/1933  France.

RICHARD A. GAUDET, *Primary Examiner*

L. W. TRAPP, *Assistant Examiner.*